March 21, 1961 F. E. ABERER ET AL 2,976,004
REVERSIBLE APPLIANCE MOUNTING
Filed May 15, 1958 2 Sheets-Sheet 1
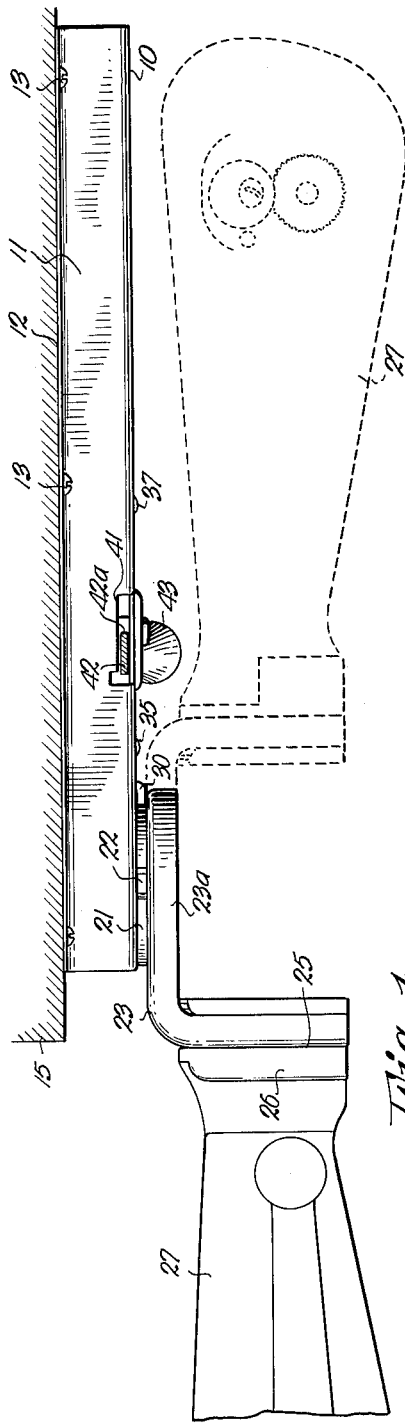
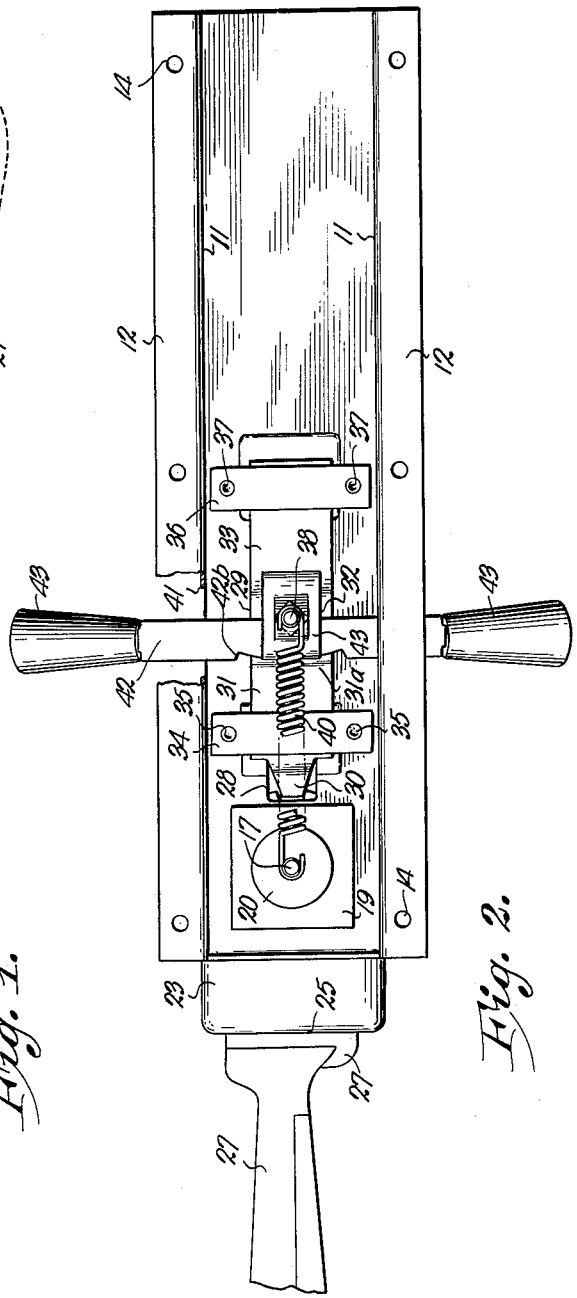
INVENTORS.
Frank E. Aberer
Henry J. Talge
BY
ATTORNEY.

March 21, 1961 F. E. ABERER ET AL 2,976,004
REVERSIBLE APPLIANCE MOUNTING
Filed May 15, 1958 2 Sheets-Sheet 2

INVENTORS.
Frank E. Aberer
Henry J. Talge
BY
ATTORNEY.

United States Patent Office 2,976,004
Patented Mar. 21, 1961

2,976,004
REVERSIBLE APPLIANCE MOUNTING

Frank E. Aberer, Kansas City, Kans., and Henry J. Talge, % Rival Manufacturing Co., 36th and Bennington, Kansas City, Mo.; said Aberer assignor to said Talge Filed May 15, 1958, Ser. No. 735,575

6 Claims. (Cl. 248—289)

This invention relates to mountings for kitchen appliances, such as can openers, and refers more particularly to such a mounting which not only permits alignment of the appliance in several alternate positions relative to the mounting but also permits complete reversal of the appliance on the mounting relative its normal operating position for storage thereof.

Previously, a number of mountings for kitchen appliances have been provided whereby the appliance can be positioned underneath a cabinet, or the like, that is, the mounting fixed to the underside of a substantially horizontal surface. In these prior cases, the appliance itself has been movable or pivotable relative its mounting in various ways in order to get the appliance out from under the surface for operation. However, all of these previous constructions have suffered from a number of weaknesses and/or defects.

In the first place, the conventional mountings are ordinarily not strong enough to satisfactorily stand the stress of appliance operation after the latter has been pivoted or moved relative the mounting to clear it from the supporting surface. To meet this problem, some conventional mountings have added supporting structure which both complicates the device and increases its expense. Secondly, the devices are generally of relatively great expense to manufacture because of their inherent complexity. Thirdly, these conventional mountings and the appliances attached thereto take up too much space underneath the mounting surface and often too greatly restrict the work area beneath the supporting surface. Another drawback to the conventional undercabinet mountings lies in the fact that only two positions for the appliance are provided, namely, the operative position and the storage position, thereby not making it possible to employ the mounting, under certain circumstances, where it is mounted near a corner. Excessive work and/or manipulation is often required by the operator to get these conventional appliances into operating position and return them to storage position, as well.

Therefore, an object of the present invention is to provide a simple yet rugged and positive acting mounting for positioning kitchen appliances under supporting surfaces such as storage cabinets.

Another object of the invention is to provide such a mounting which has a multiplicity of alternate positions in which the kitchen appliance may be positioned for operating thereof and, additionally, a storage position.

Another object of the invention is to provide such an undersurface kitchen implement mounting which is easily operable, speedy in operation, and which offers no hazard to the operator in shifting the appliance from one position to another.

Another object of the invention is to provide a mounting for kitchen appliances for undersurface mounting which, in combination with the appliance, takes up an absolute minimum of space, thereby not hindering or hampering the work area underneath.

Another object of the invention is to provide a mounting for kitchen appliances having a multiplicity of mounting and operating positions wherein, despite a great number of changes in position and long use, the operating positions' mountings for the kitchen appliances are vibrationless and positively locked, whereby the operation of the kitchen device at any of the operating positions offers no threat to the operator.

Yet another object of the invention is to provide a kitchen device having a minimum number of operating parts and a minimum number of moving parts, all of the parts being readily accessible for either repair or replacement.

Still another object of the invention is to provide a kitchen appliance mounting which is extremely simple in construction, pleasing in appearance, occupies a minimum amount of space, yet is extremely rugged in all kinds of operation and has an extremely long operating life under the most arduous and repeated operating conditions.

Another object of the invention is to provide a kitchen appliance mounting wherein the appliance may be mounted on a rotatable table fixed to a platform mountable on the undersurface of a cabinet or the like, the table merely rotatable on the platform with engaging means to engage with and disengage from the rotatable table, said engaging means slidably mounted on the platform and easily moved backward and forwardly thereon, said engaging means yet providing a rigid locking of the rotatable table in a multiplicity of positions relative the platform.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

Fig. 1 is a side view of the inventive reversible appliance mounting with the mounting shown in full lines in the operating position and in dotted lines in the storage position, a conventional can opener shown mounted on the mounting.

Fig. 2 is a top plan view with parts cut away to better illustrate the construction of the inventive appliance mounting of Fig. 1.

Figure 3:
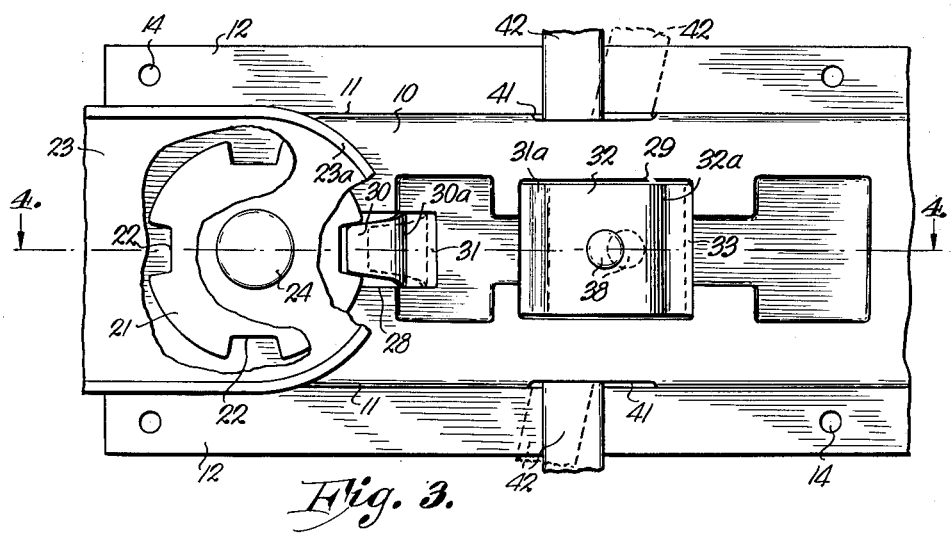
Fig. 3 is a bottom plan view of the operating end of the inventive appliance mounting of Figs. 1 and 2, parts cut away to better illustrate the construction, the appliance mounting shown locked in one position in full lines and unlocked for rotation to another position in dotted lines.
Figure 4:
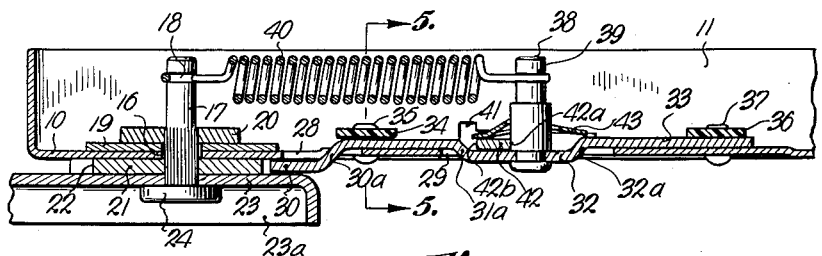
Fig. 4 is a view taken along the lines 4—4 of Fig. 3 in the direction of the arrows.
Figure 5:
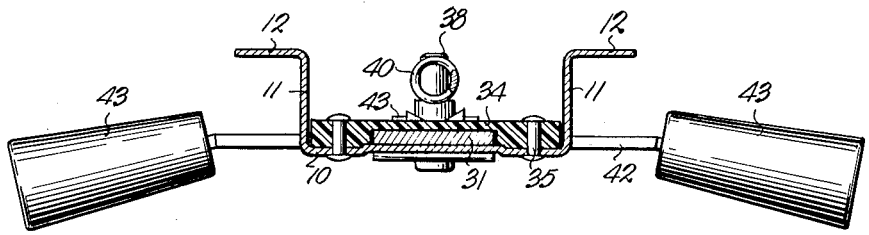
Fig. 5 is a view taken along the lines 5—5 of Fig. 4 in the direction of the arrows.

Referring to the drawings, at 10 is shown an elongate, rectangular platform having legs 11 connected to or integral with the platform and mounting flanges 12. The assembly of platform 10, legs 11 and flanges 12 comprises a support which is U-shaped in cross section. Screws 13 engage the underside of the cabinet through holes 14 formed in the mounting flanges 12. The front of the cabinet is shown at 15 in Fig. 1.

Opening 16 is positioned adjacent the front end of the platform and extends therethrough. Shaft 17 is positioned in and extends through opening 16 and has groove 18 circumferentially formed therein adjacent one end thereof. Sheet 19 rests on the upper surface of platform 10 and does not rotate with shaft 17. Enlarged circular piece 20 is fixed to the shaft 17 and rotates therewith above and on sheet 19. Table 21, preferably circular in outline and having notches 22 formed therein preferably spaced 90° apart around the circumference of the table, is fixed to the shaft 17 and rotates therewith. Secondary table 23 is fixed to table 21 and/or shaft 17 and rotates therewith. Enlarged head 24 is fixed to one end of shaft 17 and abuts against secondary table 23. Secondary table 23 has flange 23a around its circumference which extends downwardly on appliance mounting plate 25. A conventional can opener receiving bracket 26 may be fixed to plate 25. The reverse side of plate 25 may receive one or more other conventional kitchen appliances such as a knife sharpener (not shown) or the like. Conventional can opener 27 is shown schematically as mounted on the can opener bracket 26.

Primary slot 28 and secondary enlarged slot 29 are formed centrally of the platform 10 and spaced longitudinally thereof one from the other, with primary slot 28 preferably overlying somewhat the periphery of table 21. A dog having a head portion 30 and 30a, a neck portion 31 and 31a, a body portion 32 and 32a and a tail portion 33 is received at its head and body portions, respectively, within the slots 28 and 29. The head portion 30 of the dog comprises a flat piece tapered toward the table 21 which is of a thickness substantially that of the table 21 and whose width at its end next the table is such as to fit into the tapered slots 22 only a limited distance but sufficient to securely fit thereinto. Head portion 30a comprises a curved portion of greater length than the thickness of the platform 10 which passes from the lower to the upper surface of the platform 10. Neck portion 31 is a flat piece which overlies the upper surface of the platform between slots 28 and 29. Neck portion 31a is a curved portion which passes down into the slot 29. The combined lengths of the head portions 30 and 30a are less than the length of slot 28 and the combined lengths of neck portion 31a, body portion 32 and body portion 32a are less than the length of slot 29. The upper surface of body portion 32 is so formed as to lie parallel with or slightly below the upper surface of platform 10. Body portion 32a rises over the upper surface of platform 10 and connects to tail portion 33 which overlies the upper surface of platform 10. Retainer 34 comprises a bridge fixed at its ends to the upper surface platform 10 by studs 35 and preferably composed of a strong rigid material which is yet relatively frictionless, such as nylon or Teflon or like plastic. Retainer 36 holds neck portion 31 relative the top surface of platform 10. Retainer 36 holds tail portion 33 relative the top surface of the platform and is of the same construction as retainer 34 held to the platform by studs 37.

Means are provided to resiliently bias the dog toward the table and, as well, move the dog away from the table in the slots 28 and 29 against such resilient bias. The means for resiliently biasing the dog toward the table 21 comprises a post 38 attached to body portion 32 and extending upwardly therefrom. Post 38 has groove 39 adjacent its upper end at approximately the same level as groove 18 in shaft 17. Resilient spring 40 connects posts 17 and 38 and exerts force therebetween.

Slots 41 are formed in the legs 11. Arm 42 extends across the upper surface of platform through the slots 41 and has handles 43 on the free ends thereof. The edge of arm 42 next post 38 is cut out centrally as at 42a, while the opposite edge (next table 21) is formed as at 42b to avoid contact with neck portion 31a as one or the other ends of arm 42 is forced rearwardly as shown in Fig. 3. The width of arm 42 centrally thereof is only slightly less than the distance from the post 38 to the neck portion 31a. Clip 43 fits down over shaft 38 below groove 39, engages fixedly yet detachably shaft 38 and aids in maintaining arm 42 in proper operating position. However, arm 42 is free to slide and move thereunder.

The operation of the device may now be described. Starting from the full line position of Fig. 3, the dog head portion 30 is shown securely engaged with a notch 22. In the particular full line showing of Fig. 3, the appliance is swung out to operating position as in the full line showing of Figs. 1 and 2. The operator then exerts force on one (preferably only one and not both) handle 43 in order to move the dog into the dotted line position of Fig. 3. By employing only one handle, the operator employs a lever arm extending from the edge of the slot 41 nearest the table of the handle not being employed to the handle being employed. The edge of the arm 42 next table 21 bears against the edge of slot 41 and the opposite edge of the arm 42 bears against post 38. The dog thus slides rearwardly in the slots 28 and 29. The operator then may grasp either the appliance (can opener 27) or mounting plate 25 and rotate the table 90°, 180° or 270° to put the appliance in any desired alternative operating position or the storage position. Table 21 may be rotated either way, whichever leads most quickly to the desired position. If the table is to be rotated only 90°, once the slot 22 which was originally engaged with the dog head portion 30 clears the latter, the operator may release the handle 43 permitting the dog head portion 30 to abut against the periphery of the table. Table 21 may then still easily be rotated by the operator so that, when the desired slot reaches the dog head portion 30, the latter will snap thereinto under the impetus of spring 40. On the other hand, however, if it is desired to move the table past any given slot, the handle must be held rearwardly as the slot passes the dog portion 30.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all material hereinabove set forth or shown in the accompanying drawings is to be interpreted as illustrative and not in a limiting sense.

Having thus described our invention, we claim:

1. A reversible mounting comprising a channel-shaped support having legs and a base adapted to be fixed to the underside of a shelf, a table rotatably fixed to said support, said table substantially circular in outline over at least a portion of its circumference, locking means on the edge of the circular opening of the table, a pair of slots in the base of said channel support, a dog having a head portion positioned in one slot adjacent the table, a body portion positioned in the other slot and a neck portion connecting the head and body portion positioned on the side of the base opposite from the table, the dog movable within said slots so the head portion thereof may engage and disengage said locking means to permit and stop rotation of the table on said support, and resilient means connecting the dog and the table urging the dog toward said table.

2. A reversible mounting as in claim 1 including a tail portion on said dog connected to the body portion thereof, and positioned on the side of the base opposite from the table.

3. A reversible mounting as in claim 1 including a first post attached to the table and extending through the support base, a second post attached to the body portion of the dog and wherein the resilient means comprises a spring connecting the posts.

4. A reversible mounting as in claim 2 including means slidably confining one of the neck and tail portions of the dog to the side of the base opposite the table.

5. A reversible mounting comprising a channel-shaped support having legs and a base adapted to be fixed to the underside of a shelf, a table rotatably fixed to said support, said table substantially circular in outline over at least a portion of its circumference, locking means on the edge of the circular portion of the table, a slot in the base of said channel support, a dog having a head portion positioned in said slot adjacent the table and a body portion positioned on the side of the base opposite from the table, the dog movable so the head portion thereof may engage and disengage said locking means to permit and stop rotation of the table on said support, resilient means connected to the dog urging the dog toward the table, a grasping arm extending through a pair of slots in said support, said arm overlying at least some portion of said dog body portion and some portion of said support base, and means coupling said grasping arm and dog whereby to permit movement of said dog away from said table by force applied to said grasping arm.

6. A mounting as in claim 5 wherein the portion of said dog overlaid by said grasping arm is recessed to receive the latter.

References Cited in the file of this patent

UNITED STATES PATENTS

| | | |
|---|---|---|
| 518,698 | Pipes | Apr. 24, 1894 |
| 2,738,942 | Gantner | Mar. 20, 1956 |
| 2,883,138 | Aberer | Apr. 21, 1959 |